United States Patent
Kurashima et al.

(10) Patent No.: US 8,188,983 B2
(45) Date of Patent: May 29, 2012

(54) TOUCH PANEL, AND ELECTRO-OPTIC APPARATUS AND ELECTRONIC DEVICE HAVING THE TOUCH PANEL

(75) Inventors: Takeshi Kurashima, Azumino (JP); Koichi Miyasaka, Suwa (JP)

(73) Assignee: Epson Imaging Devices Corporation (JP)

( * ) Notice: Subject to any disclaimer, the term of this patent is extended or adjusted under 35 U.S.C. 154(b) by 343 days.

(21) Appl. No.: 12/555,213

(22) Filed: Sep. 8, 2009

(65) Prior Publication Data

US 2010/0060603 A1    Mar. 11, 2010

(30) Foreign Application Priority Data

Sep. 9, 2008 (JP) .................................. 2008-230599

(51) Int. Cl.
*G09G 5/00* (2006.01)

(52) U.S. Cl. ..................................................... 345/173

(58) Field of Classification Search .................. 345/173, 345/104, 179, 182, 18.08, 18.05, 174, 87; 200/310, 313, 317, 512, 516; 349/12, 61
See application file for complete search history.

(56) References Cited

U.S. PATENT DOCUMENTS

| | | | | |
|---|---|---|---|---|
| 6,529,188 | B1 * | 3/2003 | Suzuki | 345/173 |
| 6,677,542 | B2 * | 1/2004 | Katakami | 200/5 A |
| 7,034,808 | B2 | 4/2006 | Sakata et al. | |
| 7,609,252 | B2 * | 10/2009 | Horikawa et al. | 345/173 |
| 7,777,726 | B2 * | 8/2010 | Sato et al. | 345/173 |

FOREIGN PATENT DOCUMENTS

| | | |
|---|---|---|
| JP | 09-091091 | 4/1997 |
| JP | 2002-287902 | 10/2002 |
| JP | 2004-280759 | 10/2004 |
| JP | 2006-31256 | * 2/2006 |

* cited by examiner

*Primary Examiner* — Nabil Hindi
(74) *Attorney, Agent, or Firm* — Harness, Dickey & Pierce, P.L.C.

(57) ABSTRACT

A touch panel includes: a first substrate; a second substrate disposed to face the first substrate; an annular seal material that adheres peripheries of the first substrate and the second substrate to each other so as to set a gap between the first substrate and the second substrate; first seal portions that adhere corner portions of the first substrate and the second substrate through the seal material; and second seal portions that are in connection with the first seal portions and adhere side portions of the first substrate and the second substrate through the seal material. Each of the first seal portions has a thickness which is smaller than each of the second seal portions so that the substrate gap is set to be small.

8 Claims, 8 Drawing Sheets

TOUCH PANEL, AND ELECTRO-OPTIC APPARATUS AND ELECTRONIC DEVICE HAVING THE TOUCH PANEL

BACKGROUND

1. Technical Field

The present invention relates to a touch panel capable of suppressing the occurrence of Newton rings, and also relates to an electro-optic apparatus and an electronic device having the touch panel.

2. Related Art

Recently, small sized information electronic devices (hereinafter, it is referred to as electronic devices) such as PDAs (Personal Digital Assistant) and palmtop computers have become popular. Accompanied therewith, electro-optic apparatuses, in which a touch panel as a transparent input section is mounted on the liquid crystal apparatus (Liquid Crystal Display), have come into widespread use.

To make a high quality touch panel, it is necessary to suppress Newton rings (equal-thickness fringes having annular shapes that can be seen when flat glass sheets are brought into contact to each other) occurring on the panel input surface.

As techniques for suppressing the occurrence of Newton rings, for example, techniques disclosed JP-A-9-91091, JP-A-2002-287902, and JP-A-2004-280759 are known.

In JP-A-9-91091, transparent electrodes are provided on the inner surfaces of a pair of substrates, which are disposed to face each other with a predetermined gap provided therebetween, and a spacer particle group, which is formed of spherical spacer particles with diameters of 5 to 20 μm, is provided on one of these transparent electrodes, thereby suppressing the occurrence of Newton rings. In JP-A-2002-287902, a plurality of convex portions are substantially periodically formed with a pitch smaller than the wavelength of the visible light region on the at least one transparent electrode of the inner surfaces of the pair of substrates which are disposed to face each other with a predetermined gap provided therebetween, thereby suppressing the occurrence of Newton rings. Further, in JP-A-2004-280759, a pair of rectangular substrates (a front side substrate and a rear side substrate) are disposed to face each other with a seal material sandwiched between their whole circumference so that the whole circumference has a uniform gap, and the substrates are formed in a shape which is curved outward so as to have a height of 75 to 300 μm when the vertical and horizontal lengths of the front side substrate are in the range of 100 to 200 mm, thereby suppressing Newton rings which occur on the front side substrate.

However, in the techniques disclosed in JP-A-9-91091 and JP-A-2002-287902 mentioned above, it is necessary to form the plurality of convex portions and the spacer particle group on the inner surfaces of the substrates. Hence, there is a problem from the view of manufacturing cost.

According to the technique disclosed in JP-A-2004-280759, it is possible to achieve a reduction in manufacturing cost as compared with the techniques disclosed in JP-A-9-91091 and JP-A-2002-287902. However, in JP-A-2004-280759, while inclination is steep in the center region of the front side substrate, thereby suppressing the occurrence of Newton rings, inclination is slight in the vicinities of the corner portions (portions in which the adjacent side portions intersect each other) of the front side substrate to which a large binding force is applied due to the bonding with the seal material. Therefore, Newton rings tend to occur on the surface in the vicinities of the corner portions.

SUMMARY

An advantage of some aspects of the invention is that it provides a touch panel that is able to suppress the occurrence of Newton rings on the surface of the substrate in the vicinities of the corner portions to which a large binding force is applied due to the bonding with the seal material while achieving a reduction in manufacturing cost, and it also provides an electro-optic apparatus and an electronic device having the touch panel.

According to an aspect of the invention, a touch panel includes: a first substrate; a second substrate disposed to face the first substrate; an annular seal material that adheres the peripheries of the first substrate and the second substrate to each other so as to set a gap between the first substrate and the second substrate; first seal portions that adhere corner portions of the first substrate and the second substrate by using the seal material; and second seal portions that are in connection with the first seal portions and adhere side portions of the first substrate and the second substrate by using the seal material. Each first seal portion has a thickness smaller than each second seal portion so that the substrate gap is set to be small.

With such a configuration, the inclined bonding portion of the seal material is provided in the vicinities of the corner portions of the first substrate and second substrate to which a large binding force is applied due to the bonding of the seal material, and thus the inclined surface portion is formed on at least one of the corner portions of the first substrate and second substrate, thereby suppressing the occurrence of Newton rings surrounding the inclined surface portion. Further, since fringe intervals of the Newton rings occurring in the inclined surface portion are narrow, the Newton rings are dense, and thus can be made to be negligible. In addition, compared with the known techniques for suppressing Newton rings by forming the plurality of convex portions and the spacer particle group on the inner surface of the substrate, it is possible to achieve a reduction in manufacturing cost of the touch panel.

Further, in this aspect of the invention, it is preferred that the first substrate have a shape curved in a direction in which the first substrate is separated away from the second substrate at the center than the periphery.

With such a configuration, it possible to suppress the occurrence of Newton rings in the area other than the vicinities of the corner portions to which a large binding force of the first substrate is applied.

Further, in this aspect of the invention, it is preferred that the first seal portion and the second seal portion respectively have gap members for setting different substrate gaps.

With such a configuration, it is possible to easily set the substrate gap between the first seal portion and second seal portion.

Further, in this aspect of the invention, it is preferred that compressible members, of which a compressibility ratio is larger on the corner portion side and gradually becomes smaller as the side portion gets closer, be disposed in inclined bonding portions of the seal material placed over the corner portions and the side portions of the first substrate and the second substrate.

With such a configuration, the inclined bonding portion of the seal material, which changes the gap between the substrates from the corner portion toward the direction where the side portion gets closer, is formed in the vicinity of the corner portion of the first substrate and the second substrate. Therefore, it is possible to easily form the inclined surface portions on the corner portions of the at least one of the first substrate and second substrate.

According to a further aspect of the invention, an electro-optic apparatus includes: the touch panel with the above-mentioned configuration; and an electro-optic panel that is mounted on the second substrate of the touch panel. With such a configuration, it is possible to provide an electro-optic apparatus with improved visibility while achieving a reduction in manufacturing cost.

According to a still further aspect of the invention, an electronic device includes the electro-optic apparatus with the above-mentioned configuration. With such a configuration, it is possible to provide a high quality electronic device with improved visibility.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, best modes for carrying out the invention (hereinafter, it is referred to as embodiments) will be described in detail with reference to the accompanying drawings.

First Embodiment: Touch Panel

A touch panel according to the first embodiment of the invention will be described.

Figure 1:
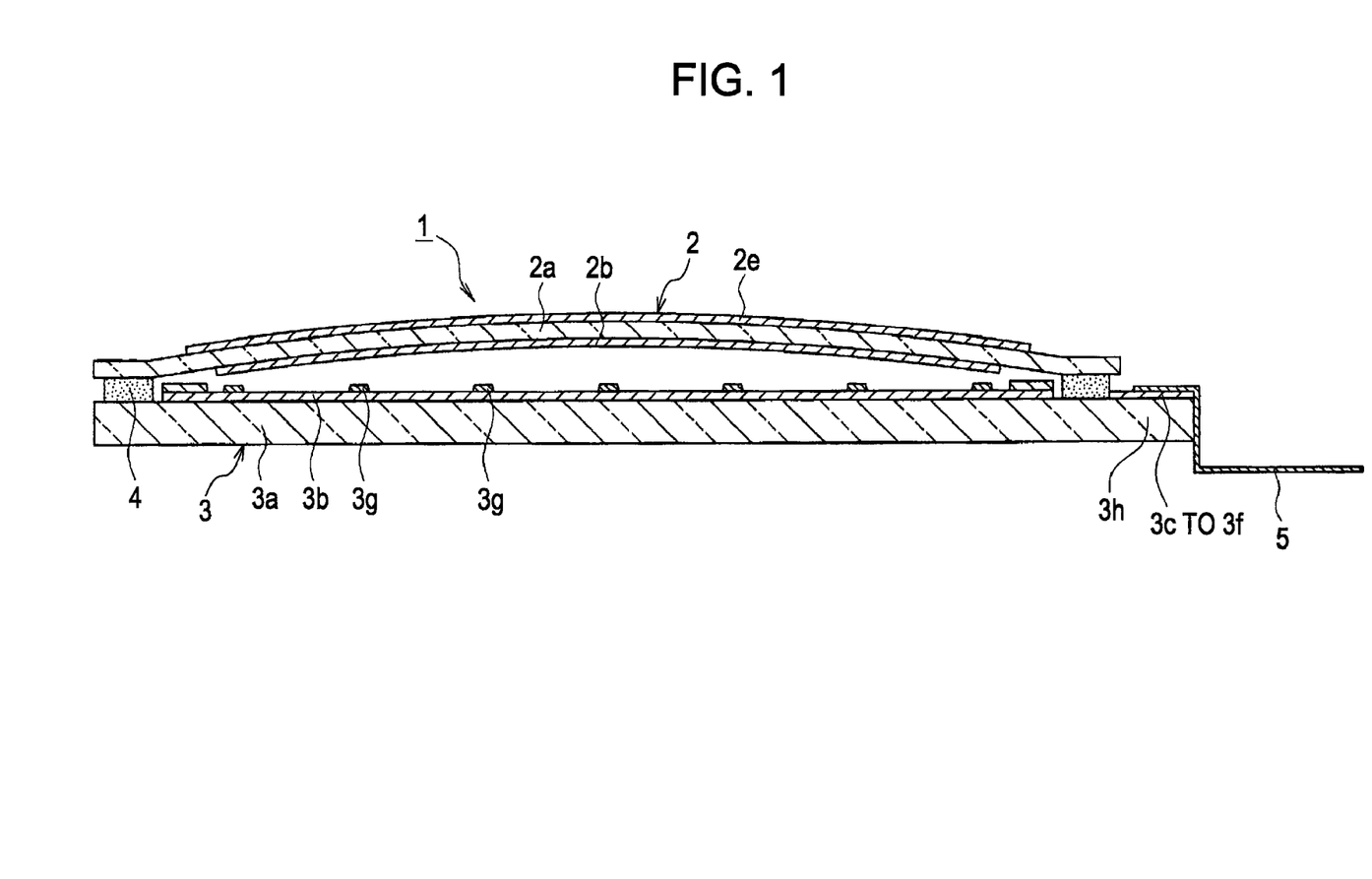
FIG. 1 is a sectional view illustrating a schematic configuration of a touch panel according to the invention.
Figure 2:
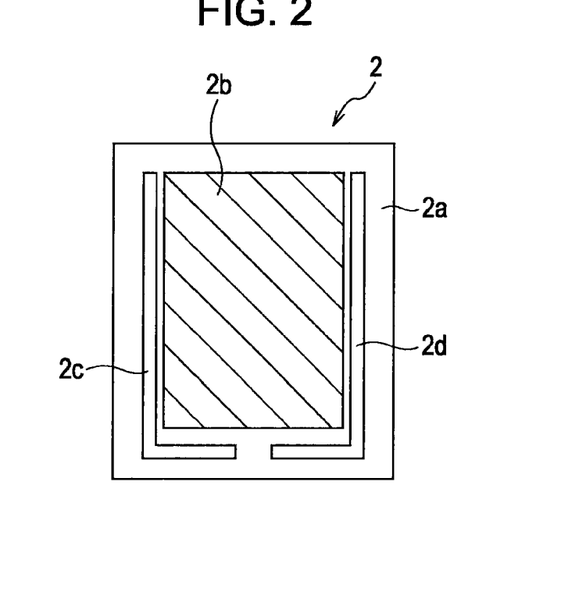
FIG. 2 is a view illustrating a surface on which a transparent electrode of a front side substrate constituting the touch panel is formed.
Figure 3:
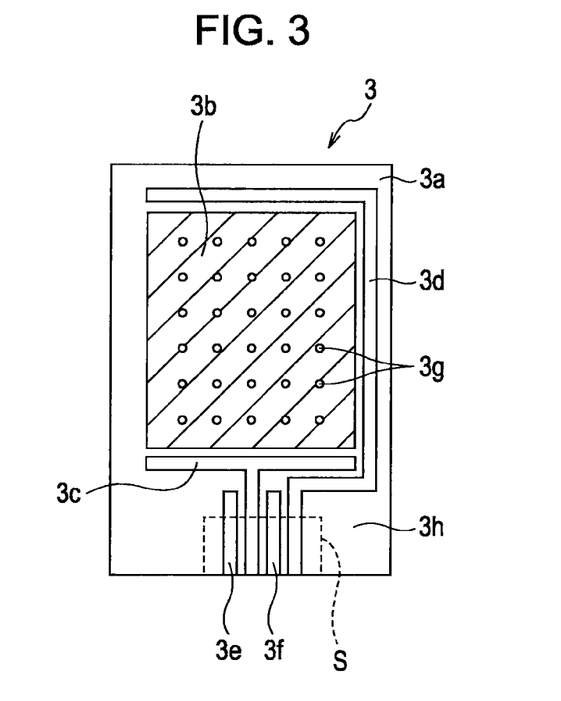
FIG. 3 is a view illustrating a surface on which a transparent electrode of a rear side substrate constituting the touch panel is formed.
Figure 4:
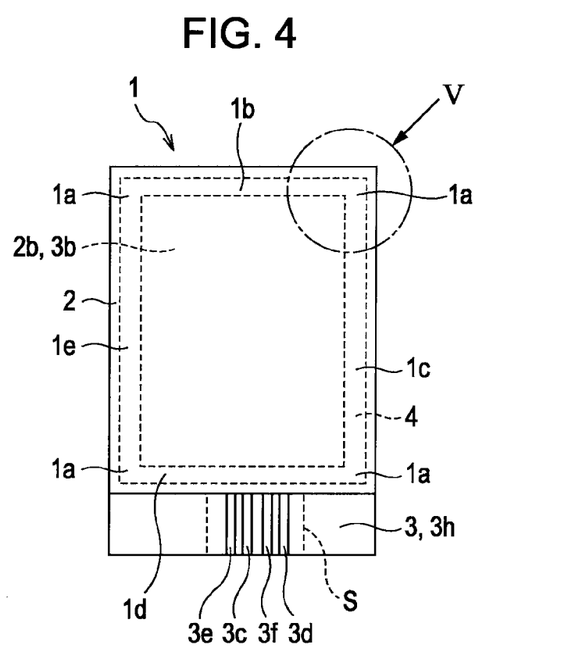
FIG. 4 is a schematic plan view illustrating the touch panel.
Figure 5:
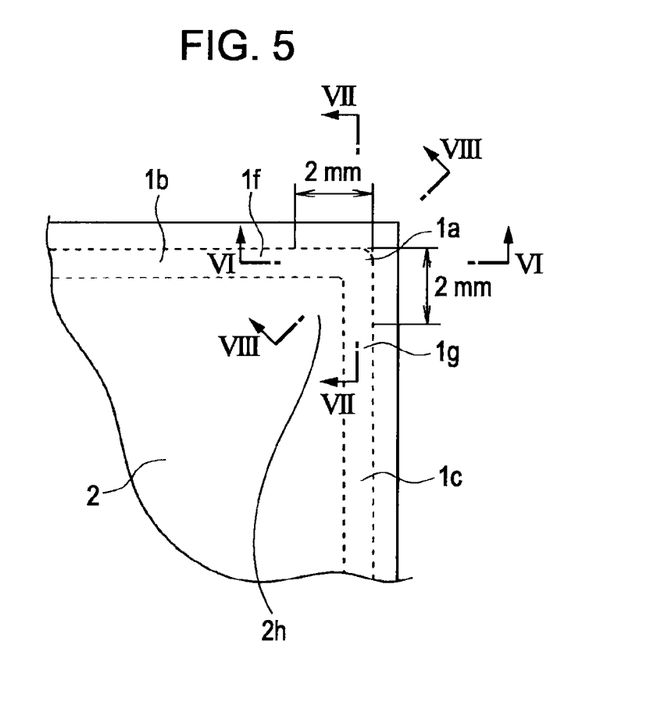
FIG. 5 is a view enlarging a part indicated by the reference sign V of FIG. 4.
Figure 6:
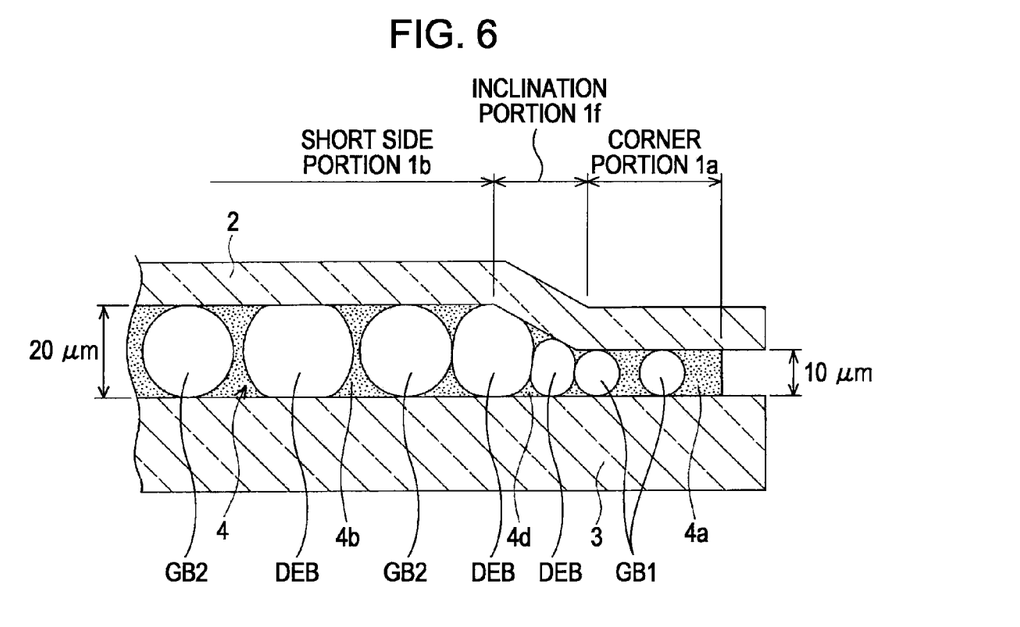
FIG. 6 is a schematic sectional view taken along line VI-VI of FIG. 5 as viewed in the direction of arrow.
Figure 7:
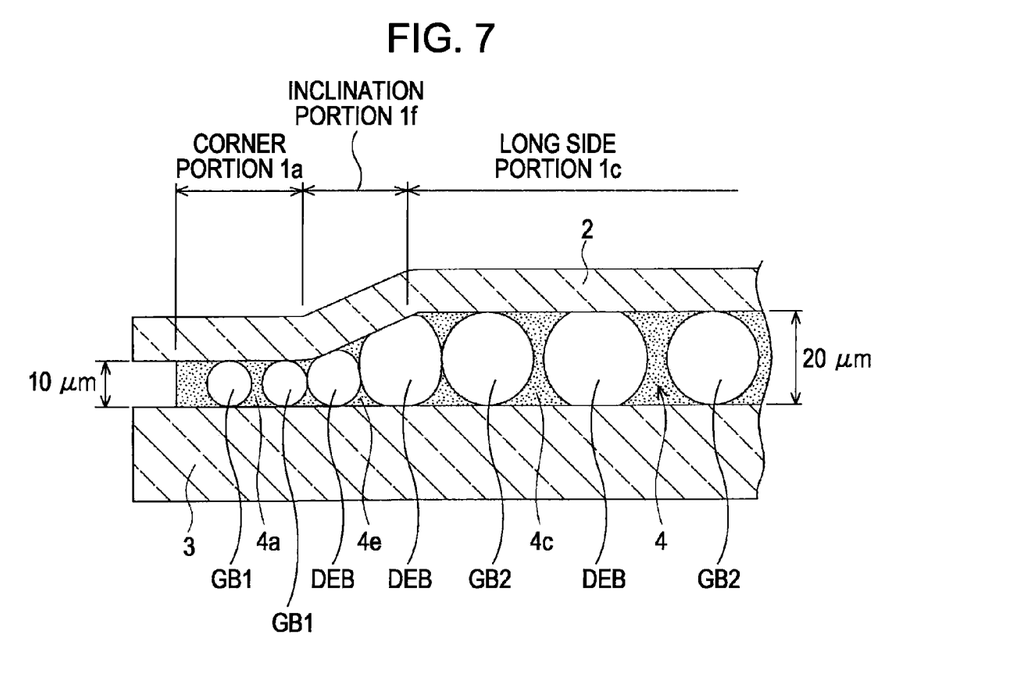
FIG. 7 is a schematic sectional view taken along line VII-VII of FIG. 5 as viewed in the direction of arrow.
Figure 8:
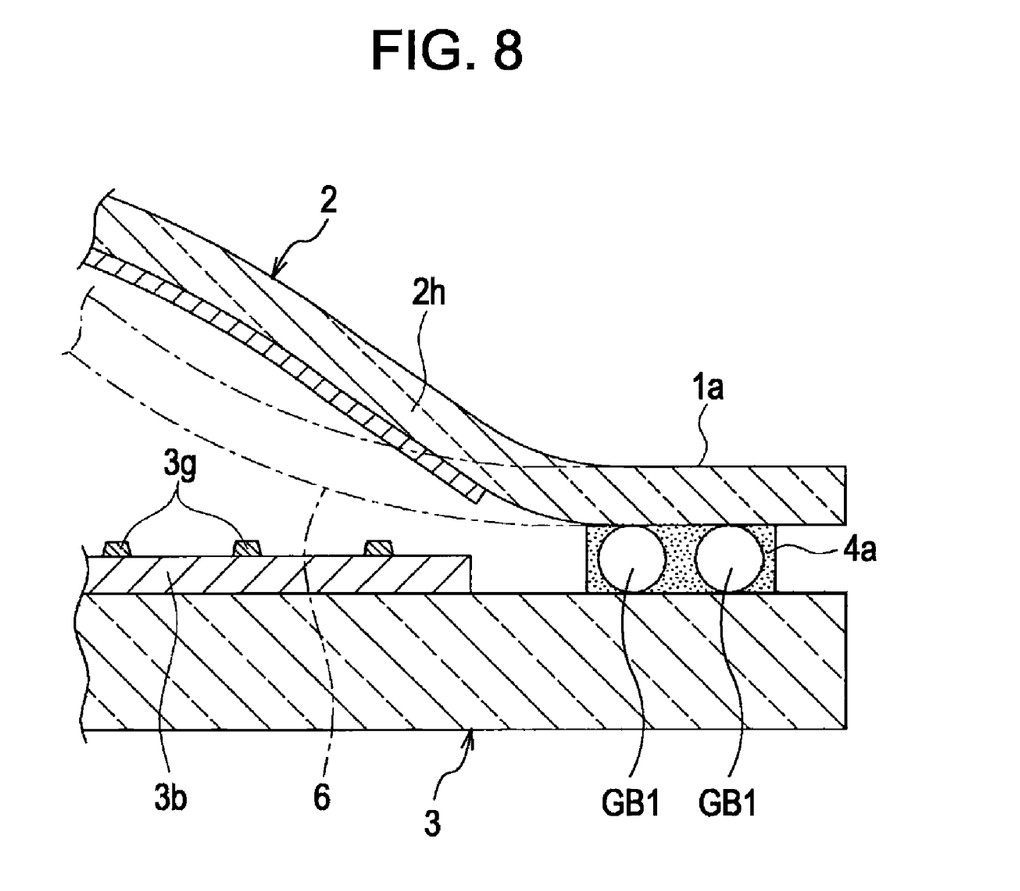
FIG. 8 is a schematic sectional view taken along line VIII-VIII of FIG. 5 as viewed in the direction of arrow.
Figure 9A:
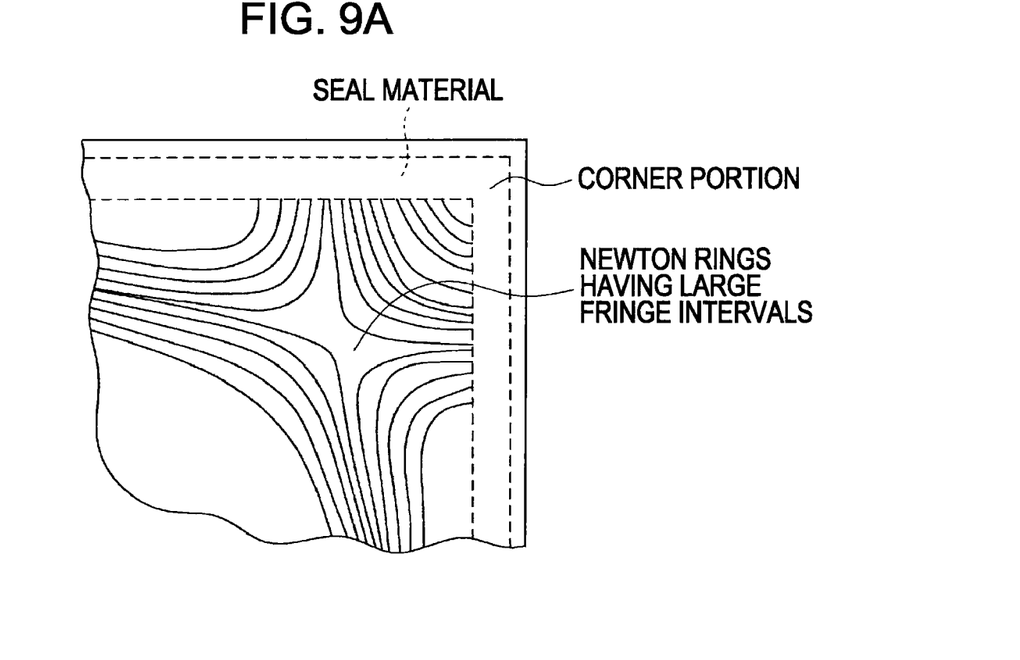
FIGS. 9A and 9B are diagrams illustrating states of occurrence of Newton rings according to a known technique and an embodiment of the invention.
Figure 9B:
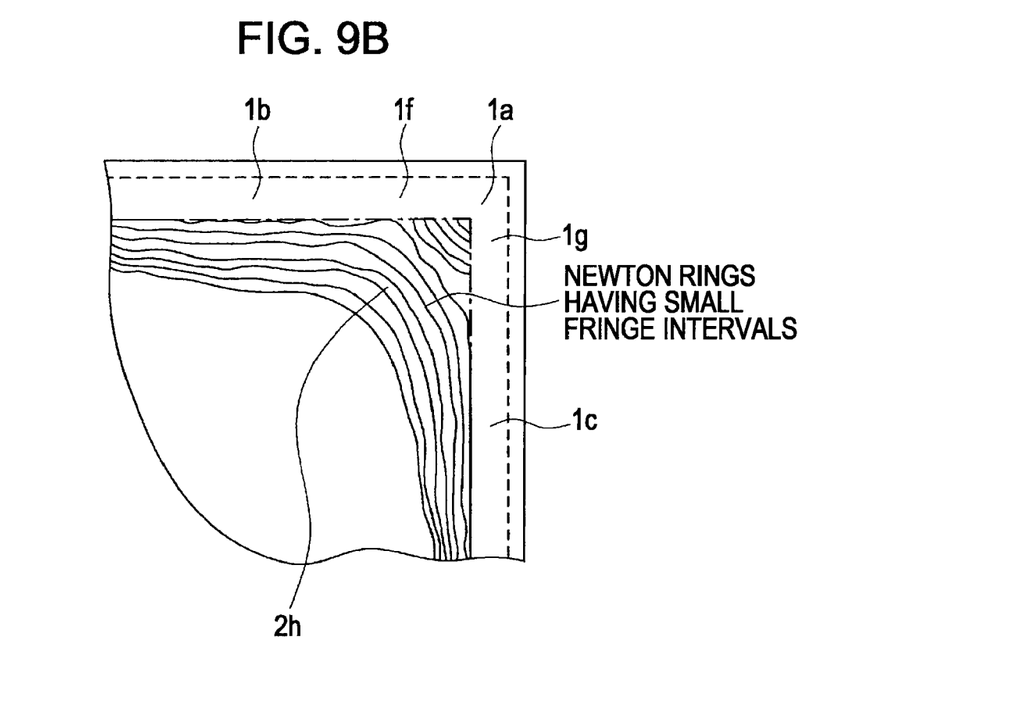

FIG. 1 is a sectional view illustrating a schematic configuration of the touch panel. FIG. 2 is a view illustrating a surface on which a transparent electrode of a front side substrate constituting the touch panel is formed. FIG. 3 is a view illustrating a surface on which a transparent electrode of a rear side substrate constituting the touch panel is formed. FIG. 4 is a schematic plan view illustrating the touch panel. FIG. 5 is a view enlarging a part indicated by the reference sign V of FIG. 4. FIG. 6 is a schematic sectional view taken along line VI-VI of FIG. 5 as viewed in the direction of arrow. FIG. 7 is a schematic sectional view taken along line VII-VII of FIG. 5 as viewed in the direction of arrow. FIG. 8 is a schematic sectional view taken along line VIII-VIII of FIG. 5 as viewed in the direction of arrow. FIGS. 9A and 9B are diagrams illustrating states of occurrence of Newton rings according to a known technique and an embodiment of the invention.

As shown in FIG. 1, the touch panel 1 includes the front side substrate 2 and the rear side substrate 3, which have rectangular shapes and face each other with a predetermined gap, and the seal material 4, which is sandwiched in an annular shape between the peripheries of the front side substrate 2 and rear side substrate 3, so as to bond the front side substrate 2 to the rear side substrate 3.

As shown in FIGS. 1 and 2, the front side substrate 2 includes the transparent substrate 2a, which has a rectangular shape, the transparent electrode 2b, which is formed in a quadrangular shape on the lower surface of the transparent substrate 2a, the routing electrodes 2c and 2d, which are connected along both sides of the transparent electrode 2b so as to be horizontally opposed as shown in FIG. 2, and the polarizing plate 2e which is attached to the upper surface of the transparent substrate 2a.

As shown in FIG. 1, the front side substrate 2 is formed in a shape which is curved outward (in a direction separating from the rear side substrate 3) due to the sealing of gas in the inner space after the front side substrate is disposed to face the rear side substrate 3 and is bonded to the seal material 4.

As shown in FIGS. 1 and 3, the rear side substrate 3 includes the transparent substrate 3a, which has a rectangular plate shape, the transparent electrode 3b, which is formed in a quadrangular shape on the upper surface of the transparent substrate 3a, the routing electrodes 3c and 3d, which are formed along both sides of the transparent electrode 3b so as to be vertically opposed as shown in FIG. 3 and are connected to the FPC attachment portion S surrounded by the dashed line existing on one margin of the transparent substrate 3a, the connection electrodes 3e and 3f which are formed in the vicinity of the FPC attachment portion S, and the plurality of dot spacers 3g which are arranged in matrix on the transparent electrode 3b.

The rear side substrate 3 has a larger outer diameter than the front side substrate 2 and substantially includes three sides (the upper, left, right sides of FIGS. 2 and 3) of the front side substrate 2 and the rear side substrate 3. The overhanging portion 3h, which overhangs from the lower side of the front side substrate 2, is formed on the lower side of the rear side substrate 3, and the FPC attachment portion S is formed on the overhanging portion 3h.

As shown in FIG. 4, between the front side substrate 2 and the rear side substrate 3 in which the transparent electrode 2b and the transparent electrode 3b are disposed to face each other, the seal material 4 with a rectangular annular shape is interposed so as to overlap with the marginal portion of the transparent electrode 2b and the transparent electrode 3b, the routing electrodes 2c, 2d, 3c, and 3d, and parts of the connection electrodes 3e and 3f, thereby adhering and fixing the front side substrate 2 and the rear side substrate 3 with the predetermined gap (the cell gap) interposed therebetween.

The seal material 4 according to the embodiment is a member in which insulating adhesive resin is filled with conductive particles, and which electrically connects the transparent electrode 2b on the front side substrate 2 and the transparent electrode 3b on the rear side substrate 3 to the routing electrodes 3c and 3d and the connection electrodes 3e and 3f of the FPC attachment portion S. Further, as shown in FIG. 1, the routing electrodes 3c and 3d and the connection electrodes 3e and 3f are electrically connected to the external input control circuit through the flexible substrate 5.

The seal material 4 adheres and fixes the periphery of the front side substrate 2 and rear side substrate 3 so that the cell gap of the corner portions, which are indicated by the reference number 1a of the touch panel 1, between the substrates (the front side substrate 2 and the rear side substrate 3) is different from the cell gap of the short side portions 1b and 1d and the long side portions 1c and 1e between the substrates. Further, each corner portion 1a in the embodiment is, as shown in FIG. 5, extended by about 2 mm toward the short and long side portions 1b to 1e from the end in plan view.

Referring to FIGS. 5 to 8, the inner structure of the seal material 4 and the shape of the front side substrate 2 near the corner portion 1a will be described in detail.

As shown in FIGS. 5 and 6, the first seal portion 4a of the seal material 4 adheres and fixes the corner portions 1a of the front side substrate 2 and rear side substrate 3. In the first seal portion 4a, the adhesive resin R is filled with the glass balls GB1 with a diameter of about 10 μm as gap material particles. In addition, the second seal portion 4b adheres and fixes the short side portion 1b of the front side substrate 2 and rear side substrate 3. In the second seal portion 4b, the adhesive resin R is filled with the glass balls GB2 with a diameter of about 20 μm as gap material particles and the compressible and deformable conductive particles DEB with diameters of about 22 to 26 μm. Further, the inclined bonding portion 4d is formed between the first seal portion 4a and the second seal portion 4b. The inclined bonding portion 4d is filled with the conductive particles DEB which has substantially the same diameter as the conductive particles DEB filled in the second seal portion 4b. Furthermore, the conductive particles DEB are elastically deformable members in which the surfaces of the particles, which are made of resin such as polystyrene or methyl methacrylate, are coated or plated with conductive materials such as metals.

As shown FIGS. 5 and 7, the second seal portion 4c of the seal material 4 adheres and fixes the long side portion 1c. In the second seal portion 4c, the adhesive resin R is also filled with the glass balls GB2 with a diameter of about 20 μm and the compressible and deformable conductive particles DEB with diameters of about 22 to 26 μm. In addition, the inclined bonding portion 4e formed between the second seal portion 4c and the first seal portion 4a is filled with the conductive particles DEB which has substantially the same diameter as the conductive particles DEB filled in the second seal portion 4c.

The same structure is also applied to the first seal portions of the seal material 4 for adhering and fixing the corner portions 1a of the other positions, the second seal portions for adhering and fixing the short side portions 1d thereof, the second seal portions for adhering and fixing the long side portions 1e thereof, and the inclined bonding portions thereof formed between the first seal portion and second seal portion.

With such a configuration, in each corner portion 1a of the touch panel 1 adhered and fixed by the seal material 4 having the above-mentioned configuration, the cell gap between the peripheries of the front side substrate 2 and the rear side substrate 3 is held at 10 μm by the glass balls GB1 with a diameter of about 10 μm as shown in FIGS. 6 and 7. Further, as shown in FIG. 6, in each of the short side portions 1b and 1d of the touch panel 1, the cell gap between the peripheries of the front side substrate 2 and rear side substrate 3 is held at 20 μm by the glass balls GB2 and the compressively deformed conductive particles DEB with a diameter of about 20 μm. In addition, as shown in FIG. 7, in each of the long side portions 1c and 1e of the touch panel 1, the cell gap between the peripheries of the front side substrate 2 and rear side substrate 3 is held at 20 μm by the glass balls GB2 and the compressively deformed conductive particles DEB with a diameter of about 20 μm.

Further, as shown in FIGS. 6 and 7, the conductive particles DEB, which are filled in the inclined bonding portions 4d and 4e formed between the first seal portion 4a and the second seal portions 4b and 4c, are elastically deformed so that the degree of compressive deformation thereof is at the maximum on the first seal portion 4a side and gradually decreases as the second seal portions 4b and 4c get closer. Thus, the inclination portions 1f and 1g, of which the inclination increases from the corner portions 1a toward the direction where the short side portions 1b and 1d and the long side portions 1c and 1e get closer, are formed in the front side substrate 2 on the seal material 4.

Further, as shown in FIG. 8, the inclined surface portion 2h is formed in the vicinity of the corner portion 1a surrounded by the inclination portions 1f and 1g in the front side substrate 2. The inclined surface portion 2h extends to be steeply inclined toward the center region of the front side substrate 2 from the corner portion 1a.

In the touch panel 1, each cell gap of the corner portions 1a between the front side substrate 2 and the rear side substrate 3 is held at 10 μm, and each cell gap of the short side portions 1b and 1d and long side portions 1c and 1e between the front side substrate 2 and the rear side substrate 3 is held at 20 μm. In addition, if the front side substrate 2 has a square shape of which vertical and horizontal lengths are in the range of 100 to 200 mm, the front side substrate 2 is curved with a curvature height thereof in the range of 50 to 200 μm from the rear side substrate 3.

Here, the first substrate according to the aspect of the invention corresponds to the front side substrate 2, the second substrate according to the aspect of the invention corresponds to the rear side substrate 3, the seal material according to the aspect of the invention corresponds to the seal material 4, the corner portion according to the aspect of the invention corresponds to the corner portion 1a, the side portions according to the aspect of the invention correspond to the short side portions 1b and 1d and the long side portions 1c and 1e, the first seal portion according to the aspect of the invention corresponds to the first seal portion 4a, the second seal portions according to the aspect of the invention correspond to the second seal portions 4a and 4c, the inclined bonding portions according to the aspect of the invention correspond to the inclined bonding portions 4d and 4e, the gap member according to the aspect of the invention corresponds to the glass balls GB1 and GB2, the compressible member according to the aspect of the invention corresponds to the conductive particles DEB.

Next, advantages of the touch panel 1 according to the embodiment will be described with reference to the accompanying drawings.

In the front side substrate of existing touch panels, the cell gaps of the corner portions and the side portions are set to have the same height. Therefore, the front side substrate has a shape slightly inclined in the vicinity of the corner portion 1a, like the portion 6 which is indicated by the chain line of FIG. 8. Hence, as shown in FIG. 9A, the Newton rings with large fringe intervals occurs in the large area (the portion which has a slightly inclined shape) in the vicinity of the corner portion 1a to which a large binding force is applied due to the bonding with the seal material.

However, in the front side substrate 2 of the touch panel 1 according to the embodiment, the inclined surface portion 2h extends so as to be steeply inclined toward the center portion of the front side substrate 2 from the corner portion 1a in the vicinity of the corner portion 1a surrounded by the inclination portions 1f and 1g as indicated by the solid line of FIG. 8. Thus, as shown in FIG. 9B, occurrence of Newton rings around the inclined surface portion 2h is suppressed. Further, since fringe intervals of the Newton rings occurring in the inclined surface portion 2h are narrow, the Newton rings are dense, and thus can be made to be negligible.

Moreover, since the front side substrate 2 is formed in a shape which is curved in a direction separating from the rear side substrate 3, the whole region thereof is inclined. Therefore, it is also possible to suppress the occurrence of Newton rings even in areas other than the corner portions 1a.

As described above, since occurrence of Newton rings can be suppressed in the whole region of the front side substrate 2 including the vicinity of the corner portion 1a, it is possible to provide a high-quality touch panel 1 while achieving a decrease in frame size.

Further, in the touch panel 1 according to the embodiment, when the cell gaps of the corner portions 1a, the short side portions 1b and 1d, and the long side portions 1c and 1e are within 20 μm and the substrate has a square shape with vertical and horizontal lengths in the range of 100 to 200 mm, the curvature height of the front side substrate 2 is set in the range of 50 to 200 μm. Therefore, it is possible to achieve a decrease in thickness of the touch panel 1.

Further, the cell gaps of the corner potions 1a are set to 10 μm, the cell gaps of the short side portions 1b and 1d and the long side portions 1c and 1e are set to 20 μm, and the front side substrate 2 is formed in the shape which is curved in the direction which separates it from the rear side substrate 3, thereby suppressing the occurrence of Newton rings. With such a configuration, it is possible to achieve a reduction in manufacturing cost of touch panels compared with the existing technique for suppressing the occurrence of Newton rings by forming the plurality of convex portions or the spacer particle group on the inner surface of the substrate.

Furthermore, since the adhesive resin R is filled with the glass balls GB1 with a diameter of about 10 μm as gap material particles in the first seal portion 4a of the seal material 4, it is possible to easily set the cell gaps (10 μm) of the corner portions 1a. Since the adhesive resin R is also filled with the glass balls GB2 with a diameter of about 20 μm in the second seal portions 4b and 4c, it is possible to easily set the cell gaps (20 μm) of the second seal portions 4b and 4c.

In addition, since the inclined bonding portions 4d and 4e filled with the elastically deformable conductive particles DEB are formed between the corner portions 1a and the second seal portions 4b and 4c, it is possible to easily form the inclination portions 1f and 1g of which the inclination increases from the corner portions 1a toward the direction where the short side portions 1b and 1d and the long side portions 1c and 1e get closer.

Furthermore, the invention is not limited to the embodiment. For example, only the inclination portions 4d and 4e may be formed in which the inclination thereof increases from the corner portions 1a close to the second seal portions 4b and 4c toward the direction where the short side portions 1b and 1d get closer. In addition, only the inclined bonding portions 4d and 4e may be formed in which the inclination thereof increases from the corner portions 1a toward the direction where the long side portions 1c and 1e get closer. Even in such a configuration, it is possible to suppress the occurrence of existing Newton rings.

Further, in the embodiment, the elastically deformable conductive particles DEB are used as a member for forming the inclined bonding portions 4d and 4e. However, glass fibers and photo spacers may be used instead of the conductive particles DEB.

Second Embodiment: Touch Panel Integrated LCD Module: Electro-Optic Apparatus

Figure 10:
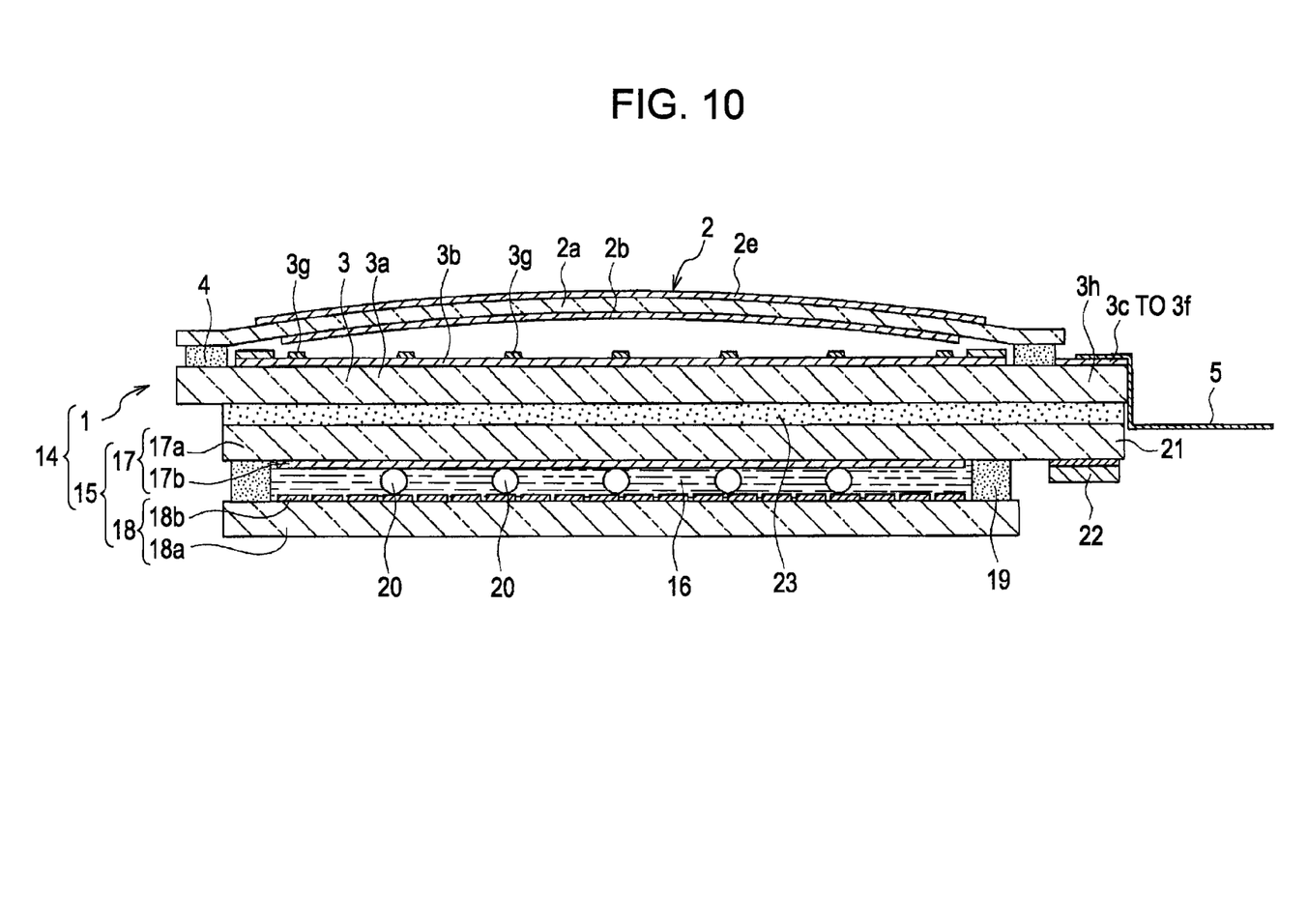
FIG. 10 is a sectional view illustrating a schematic configuration of an electro-optic apparatus according to the embodiment of the invention.

Next, FIG. 10 is a sectional view illustrating a touch panel integrated LCD module 14 according to the second embodiment of the invention. Furthermore, the same components as that of FIGS. 1 to 9 are referenced by the same reference numerals and signs, and the description thereof will be omitted.

The touch panel integrated module 14 includes the touch panel 1 according to the first embodiment and the LCD (Liquid Crystal Display) 15 mounted on the rear side of the touch panel 1.

The LCD 15 is formed in a way that the front side substrate 17 and the rear side substrate 18, which are disposed to face each other with the liquid crystal layer 16 sandwiched therebetween, are adhered and integrated by the seal material 19 provided in an annular shape between the peripheries of these two substrates.

The front side substrate 17 has a configuration in which a liquid crystal alignment control layer having the front side electrode 17b made of a transparent conductive material and an alignment film (not shown in the drawing) is formed on the surface close to the liquid crystal layer 16 of the substrate main body 17a as a transparent substrate. The rear side substrate 18 has a configuration in which a liquid crystal alignment control layer having the rear side electrode 18b made of the transparent conductive material and an alignment film (not shown in the drawing) is formed on the surface close to the liquid crystal layer 16 of the substrate main body 18a as a transparent substrate. Between the front side substrate 17 and the rear side substrate 18, the granular spacers 20 are distributed so as to maintain the cell gap between the substrates at a uniform distance.

The front side substrate 17 is provided with the overhanging portion 21 which overhangs so as to be close to the outer periphery of the rear side substrate 18. The overhanging portion 21 has a wire pattern (not shown in the drawing) formed thereon, and the front side electrode 17b of the front side substrate 17 and the rear side electrode 18b of the rear side substrate 18 are electrically connected to the wire pattern. The wire pattern of the overhanging portion 21 has the liquid crystal driving IC 22 which is mounted thereon as an electronic component for electrically driving the LCD 15.

The front side substrate 17 and the rear side substrate 3 of the touch panel 1 are optically adhered to each other by the adhesive 23 including translucent elastic bodies.

Furthermore, although omitted in FIG. 10, the outer surface sides of the front side substrate 17 and the rear side substrate 18 of the LCD 15 are each provided with polarizing plates. Any one of the pair of polarizing plates may be formed on the liquid crystal layer 16 side of the substrate main body 17a or the substrate main body 18a. Further, an illumination apparatus as a backlight is formed outside the rear side substrate 18. Furthermore, at least the pair of polarizing plates may be disposed with the liquid crystal interposed therebetween. When the polarizing plate is disposed on the surface of the touch panel 1, the polarizing plate on the outer surface side of the front side substrate 17 is not necessary.

Here, the electro-optic apparatus according to the aspect of the invention corresponds to the touch panel integrated LCD module 14, and the electro-optic panel according to the aspect of the invention corresponds to the LCD 15.

Since the touch panel integrated LCD module 14 according to the embodiment has the touch panel 1 for achieving a decrease in frame size by suppressing the occurrence of Newton rings, luminance and the contrast ratio of the LCD 15 are improved. Hence, it is possible to improve visibility of the touch panel integrated LCD module 14.

Further, the cell gaps of the corner portions 1a, the short side portions 1b and 1d, and the long side portions 1c and 1e are within 20 μm, and the substrate has a square shape with the vertical and horizontal lengths in the range of 100 to 200 mm. Accordingly, by using the touch panel 1 in which the curvature height of the front side substrate 2 is set in the range of 50 to 200 μm, it is possible to achieve a decrease in the thickness of the touch panel integrated LCD module 14.

In addition, since the touch panel 1 for achieving a reduction in manufacturing cost is used, it is possible to reduce the manufacturing cost of the touch panel integrated LCD module 14.

Furthermore, the electro-optic apparatus according to the aspect of the invention is not limited to the touch panel integrated LCD module 14 shown in FIG. 10, and it is apparent that various modifications and variations may be made without departing from the technical scope of the invention. For example, the aspect of the invention may be similarly applicable to various electro-optic apparatuses such as electroluminescence apparatuses, organic electroluminescence apparatuses, plasma display apparatuses, electrophoretic display apparatuses, and apparatuses using electron emission elements (Field Emission Display, Surface-Conduction Electron-Emitter Display, and the like).

Third Embodiment: PDA: Electronic Device

Figure 11:
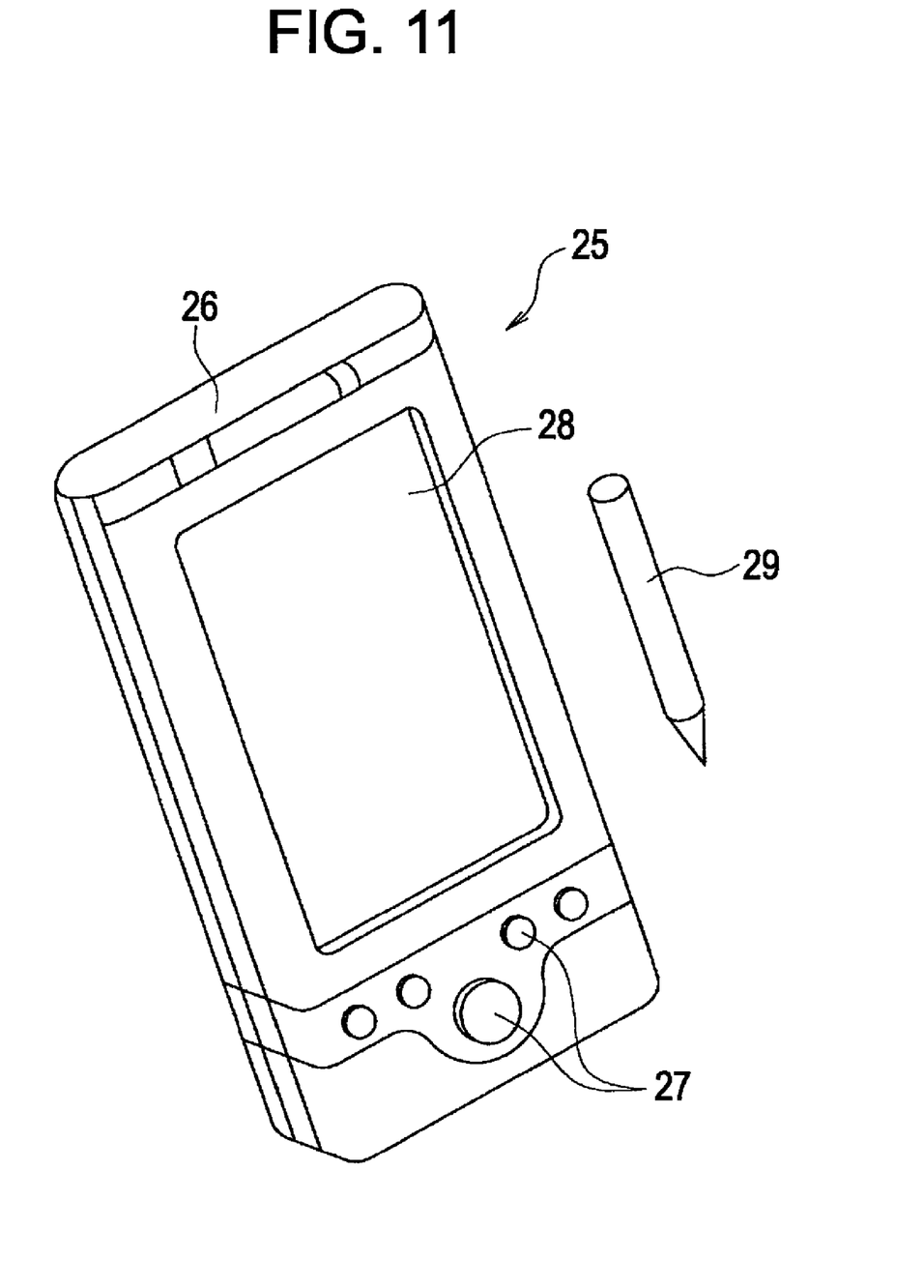
FIG. 11 is a perspective view illustrating a schematic configuration of an electronic device according to the embodiment of the invention.

Next, FIG. 11 is a schematic perspective view illustrating a PDA (Personal Digital Assistant) according to an embodiment of the invention.

The PDA 25 according to the embodiment includes a functional key 27 which constitutes an operational portion on the casing 26 and the touch panel integrated LCD module 14, which is built in the casing 26, according to the second embodiment shown in FIG. 10.

Here, the film indicated by the reference numeral 28 is adhered and attached to the polarizing plate 2e of the touch panel 1 constituting the touch panel integrated LCD module 14.

In the PDA 25 according to the embodiment, operations such as data input are performed by pressing the top of the touch panel 1 (the film 28) with the input pen 29 while viewing the printed identification information near the functional key 27 and the screen display of the LCD 15 laminated below the touch panel 1.

Here, the electronic device according to the aspect of the invention corresponds to the PDA 25.

In the PDA 25 according to the embodiment, a decrease in frame size of the touch panel 1 constituting the apparatus is achieved by suppressing the occurrence of Newton rings, thereby improving visibility. Therefore, it is possible to provide an apparatus of which display is bright and operability is excellent.

Further, since a decrease in thickness and a reduction in manufacturing cost of the touch panel integrated LCD module 14 constituting the PDA 25 are achieved, it is possible to provide a thin PDA 25 while achieving a reduction in manufacturing cost.

Furthermore, the electronic device according to the aspect of the invention is not limited to the PDA 25, and may be mounted on various electronic devices. For example, the aspect of the invention may be applicable to mobile phones, electronic books, personal computers, digital still cameras, liquid crystal televisions, viewfinder-type or monitor-direct-view-type videotape recorders, car navigation apparatuses, pagers, electronic diaries, calculators, word processors, workstations, video phones, POS terminals, and printing apparatuses.

The entire disclosure of Japanese Patent Application No. 2008-230599, filed Sep. 9, 2008 is expressly incorporated by reference herein.

What is claimed is:

1. A touch panel comprising:
   a first substrate;
   a second substrate disposed to face the first substrate;
   an annular seal material that adheres peripheries of the first substrate and the second substrate to each other so as to set a first gap between corner portions of the first and second substrates and to set a second gap between side peripheral portions of the first and second substrates;
   first seal portions that adhere the corner portions through the seal material; and
   second seal portions that adhere the side peripheral portions through the seal material and that are in connection with the first seal portions through inclination portions that adjust gap differences between the first and second gaps, wherein
   the first gap is smaller than the second gap, and the first seal portions are partially surrounded by the inclination portions.

2. The touch panel according to claim 1, wherein the first substrate has a shape curved in a direction in which the first substrate is separated further away from the second substrate at a center part of the first substrate than a periphery part of the first substrate.

3. The touch panel according to claim 1, wherein the first Seal portions and the second seal portions have first and second gap members, respectively, for setting the first and second gaps.

4. The touch panel according to claim 1, wherein the inclination portions have compressible gap members for adjusting the gap differences between the first and second gaps, a compressibility ratio of the compressible gap members that are provided at the corner portions is larger than the compressibility ratio of the compressible gap members that are provided at a side close to the side peripheral portions, and the compressibility ratio of the compressible members gradually becomes smaller from the corner portions toward the side of the side peripheral portions.

5. A touch panel comprising:
   a first substrate;
   a second substrate disposed to face the first substrate;
   an annular seal material that adheres peripheries of the first substrate and the second substrate to each other so as to set a first gap between corner portions of the first and second substrates and to set a second gap between side peripheral portions of the first and second substrates;
   first seal portions that adhere the corner portions through the seal material; and
   second seal portions that adhere the side peripheral portions through the seal material and that are in connection with the first seal portions through inclination portions that adjust gap differences between the first and second gaps, wherein
   the seal material that is provided at the first seal portions is smaller than the seal material that is provided at the second seal portions.

6. An electro-optic apparatus comprising:
   the touch panel according to claim 1; and
   an electro-optic panel that is mounted on the second substrate of the touch panel.

7. An electronic device comprising the electro-optic apparatus according to claim 6.

8. An electro-optic apparatus comprising:
   the touch panel according to claim 5; and
   an electro-optic panel that is mounted on the second substrate of the touch panel.

* * * * *